Sept. 4, 1934.  H. S. EBERHARD  1,972,077
SEAL
Filed March 13, 1931
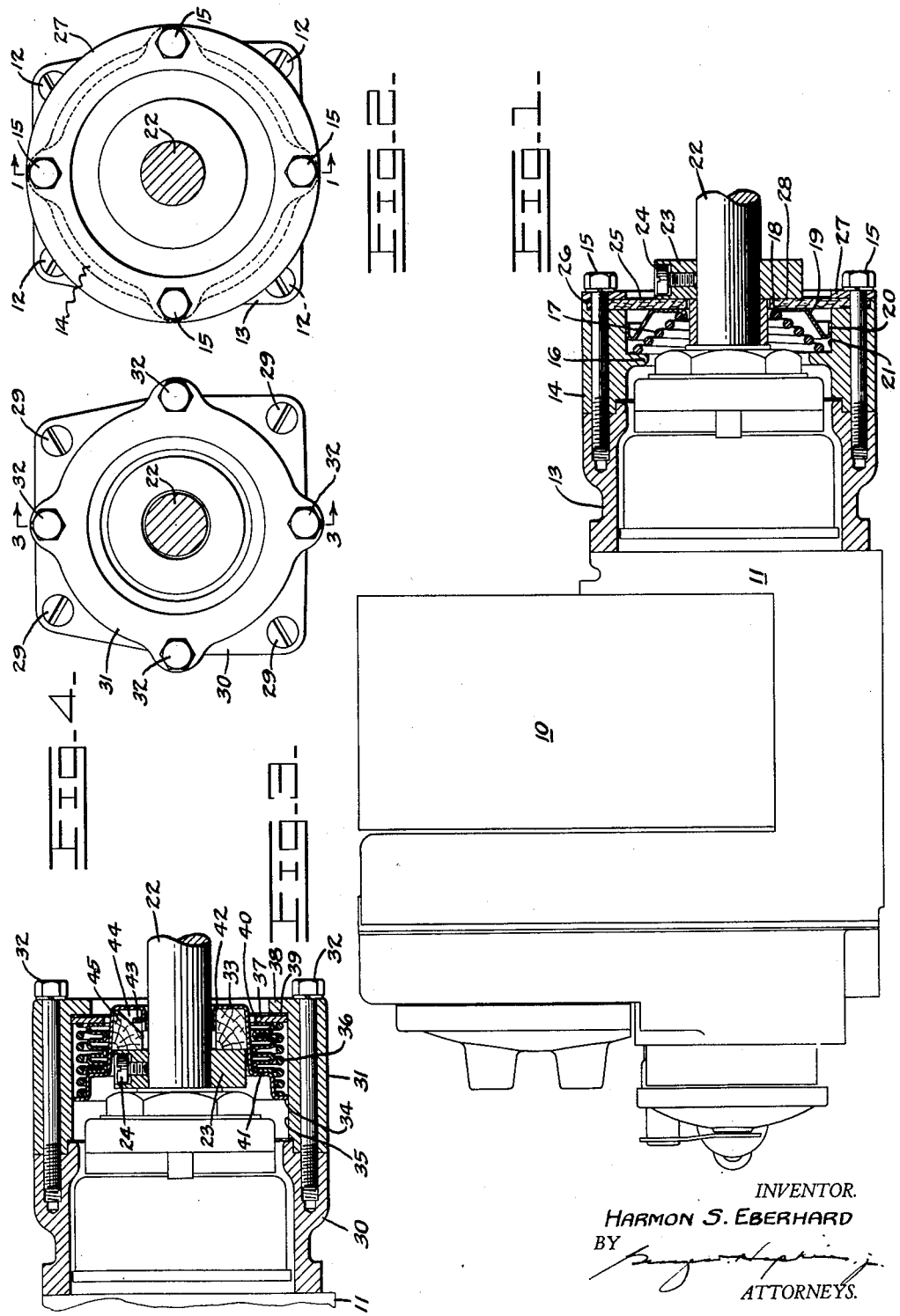
INVENTOR.
HARMON S. EBERHARD
BY
ATTORNEYS.

Patented Sept. 4, 1934

1,972,077

UNITED STATES PATENT OFFICE 1,972,077

SEAL

Harmon S. Eberhard, San Leandro, Calif., assignor to Caterpillar Tractor Co., San Leandro, Calif., a corporation of California Application March 13, 1931, Serial No. 522,296

1 Claim. (Cl. 286—11)

The invention relates to seals, and particularly to shaft seals.

Fig. 1 illustrates a device in which the invention is embodied, the seal being shown in section as taken on line 1—1 of Fig. 2.

Fig. 2 is an end elevation.

Fig. 3 is a sectional view of another embodiment, taken on line 3—3 of Fig. 4.

Fig. 4 is an end elevation.

For purposes of illustration, the seal is shown as applied to the drive shaft of a magneto which is shown at 10. Secured to the base 11 of the magneto by screws 12 is a portion 13 of a housing, the other portion 14 of which is connected thereto by cap screws 15. Housing portion 14 has an internal flange 16 which serves as a seat for spring 17, the other end of which is seated at 18 in a shield 19, having a flange 20 adapted to fit against the inner wall 21 of housing 14. Magneto shaft 22 is provided with collar 23 which is secured thereto by set screw 24. Between shield 19 and collar 23 is an annular diaphragm or washer 25 which can be of leather, rawhide, or treated fabric. The periphery of washer 25 is secured in seat 26 in the end of housing 14 by clamping ring 27 and screws 15. Spring 17 urges shield 19 to the right in Fig. 1, pressing washer 25 against face 28 of collar 23, thus preventing entry of water, dust and dirt to the magneto bearings around the drive shaft.

In the embodiment illustrated in Figs. 3 and 4, secured to base 11 by screws 29 is a portion 30 of the housing, the other portion 31 of which is secured thereto by screws 32. The cup-shaped shield 33 encompasses shaft 22, and the periphery of flange 34 contacts inner wall 35 of housing 31. Flange 34 is the seat for one end of spring 36, the other end of which bears against ring 37 which is retained by internal flange 38 on housing 31. Fibrous washer 39 is interposed between ring 37 and flange 38. Ring 37 and shield 33 are interconnected by a flexible bellows 40, one end of which is secured to ring 37, the other end of which is secured at 41 to shield 33. Adjacent shaft 22, shield 33, is an inwardly turned flange 42, having lugs 43 struck out to engage in slots 44 of ring 45 which fits into shield 33. Ring 45 is shown as made of impregnated wood, but such material as cork, fibre, or molded compounds could also be used. Ring 45 is urged against collar 23 which is retained on shaft 22 by set screw 24. Spring 36 serves both to press ring 37 against washer 39 and to press ring 45 against collar 23. Furthermore, the seal is readily assembled or taken apart for replacement of worn parts. It can be considered as comprising three main parts; the collar secured to the shaft, a housing secured to the magneto, and the expansible unit, comprising the shield, spring and rings, which are urged in opposite directions. The expansible unit, it will be noted, is not fastened to any part of the magneto but is assembled and retained in place simply by attaching the housing.

I, therefore, claim as my invention:

A seal between a rotatable shaft and a housing having an open end through which the shaft projects, comprising a collar mounted for rotation with said shaft, a flexible sealing washer secured to said housing at the open end thereof and having a surface adapted to be thrust against said collar, a shield within the housing mounted for slidable movement axially of said shaft and having a flat portion adapted to be thrust against the opposite surface of said washer, said shield peripherally contacting the interior wall of said housing to prevent movement thereof in a direction transverse to the axis of said shaft, a peripheral internal flange on said housing and spaced inwardly from the open end thereof, and a conically coiled spring compressed between said flange and said flat portion of sad shield to maintain sealing contact between the collar, washer and shield.

HARMON S. EBERHARD.